United States Patent

Proulx

[15] 3,701,494

[45] Oct. 31, 1972

[54] ELECTROPNEUMATICALLY CONTROLLED SERVO FOR TAPE MECHANISM

[72] Inventor: George G. Proulx, Bedford, Mass.

[73] Assignee: Honeywell, Inc., Minneapolis, Minn.

[22] Filed: April 20, 1970

[21] Appl. No.: 29,938

[52] U.S. Cl. ................................242/184, 242/75.51
[51] Int. Cl. ............................................B65h 59/00
[58] Field of Search....................242/183–191, 75.5, 242/75.51; 338/12, 42; 318/6, 7; 336/30, 40

[56] References Cited

UNITED STATES PATENTS

| | | | |
|---|---|---|---|
| 3,319,901 | 5/1967 | Kurth | 242/184 |
| 3,259,330 | 7/1966 | Baybick et al. | 242/184 |
| 2,921,753 | 1/1960 | Lahti et al. | 242/184 |
| 2,998,939 | 9/1961 | Scott | 242/188 |

*Primary Examiner*—Leonard D. Christian
*Attorney*—Fred Jacob and Ronald J. Reiling

[57] ABSTRACT

An electropneumatic servo device for a tape drive mechanism including vacuum tape loop chambers, the differential pressures of which are sensed to develop signals which, in conjunction with a motor speed feedback signal, are used to drive the reel motors of the tape drive.

15 Claims, 5 Drawing Figures

PATENTED OCT 31 1972 3,701,494

2 Sheets-Sheet 1

INVENTOR
GEORGE G. PROULX
BY Anthony J. Harli, Jr.
ATTORNEY

INVENTOR
GEORGE G. PROULX
BY
ATTORNEY

ELECTROPNEUMATICALLY CONTROLLED SERVO FOR TAPE MECHANISM

BACKGROUND AND OBJECTS

The instant invention relates to a high-speed digital tape transport of the reel-to-reel type for driving a magnetic tape past a magnetic transducer which includes erase, read and write heads for transferring data to or from the tape.

In most modern digital tape drive systems, one or more capstans are used to move a relatively short segment of the magnetic tape past the transducer at high speed. Since, in digital information handling, high speed is necessary across the transducer, in both forward and reverse directions, the tape cannot be moved directly from reel to reel. The reel inertia, particularly with the relatively large reels currently in use, would prevent the high speed movement of the tape necessary for efficient data handling.

As a solution to this problem, most advance systems utilize tape loop chambers between the supply reel and the transducer and between the take-up reel and the transducer to act as buffers between the reels and the low-inertia, high-speed capstan drives.

In the use of loop chambers as tape buffers, sensors are generally used to sense the position of the tape loop within the loop chamber. As the length of the loop increases or decreases commands are fed to the reel motors to drive the motors forward or backward to tend to maintain the tape loop at a central position.

To this end, a number of systems have been devised including systems utilizing photoelectric sensing and vacuum sensing of tape loop position. Many proposed systems are quite sophisticated and elaborate and include multiple sensors along the tape loop chamber, the actuation of which produces a multiplicity of commands for different situations. Varying situations may arise, for example, where most of the tape has been transferred to the take-up reel and little remains on the supply reel. In this case, systems usually provide a longer tape loop in the take-up chamber in order to compensate for the increased inertia of the reel containing more tape. In systems in which the reel motor is driven at a constant speed, a longer loop in the chamber associated with that reel may be necessary to provide for rapid movement of the tape across the capstan, since, for each revolution of the reel motor, progressively less tape will be provided to the buffer chamber.

In some prior art systems, tape leading logic is used to anticipate the direction of motion of the tape and adjust the tape loops to correspond to the anticipated direction. These systems are relatively complex and expensive and require additional hardware to implement.

A better solution to problems associated with direction of tape travel, reel inertia variables and reel size variables is a motor speed control which is more precise than those hitherto in use, and a tape position sensor which provides a continuous linear response instead of discrete or step responses.

If reel speed and tape can be more accurately controlled, the need for reel motor brakes would also be eliminated.

It is an object of the present invention to provide a simple, inexpensive, and reliable tape loop position sensing means.

It is a further object of the invention to provide a reel motor speed control system which is versatile and reliable in operation, eliminating the need for many of the subsystems of prior art tape drive devices such as leading logic and reel motor brakes.

SUMMARY OF THE INVENTION

The foregoing objects of the present invention are attained by providing a simple proportional manifold tape loop position sensor with a magneto-resistive device, providing an output which is differentially combined with the output of a DC tachometer generator connected to the reel motor to develop a reel motor driving voltage proportional to said tape loop position and reel motor speed, thus eliminating the necessity for reel motor braking, and having the flexibility and versatility to negate the necessity for tape positioning logic external to the loop position sensor.

BRIEF DESCRIPTION OF THE DRAWINGS

Other objects and advantages of the invention become apparent from a consideration of the following description and claims taken together with the accompanying drawings in which:

DETAILED DESCRIPTION OF A PREFERRED EMBODIMENT

Figure 1:
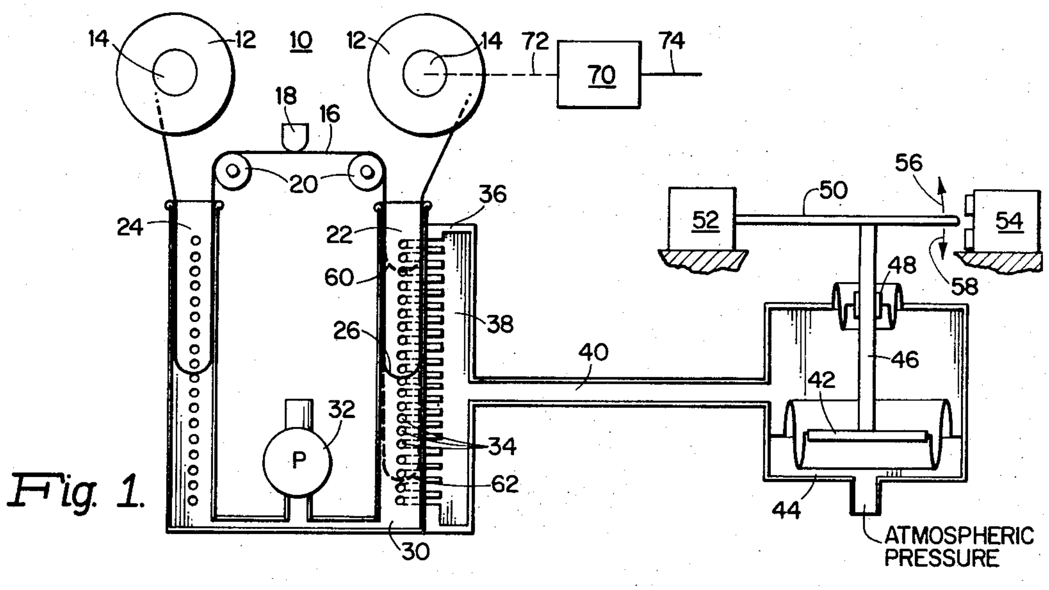
FIG. 1 shows a digital tape drive with reels and vacuum chambers, and a tape loop position sensing device.

In FIG. 1, a tape drive unit is indicated generally at 10. The unit consists of tape reels 12 driven by reel motors 14. A magnetic tape is generally indicated at 16 and a magnetic transducer is shown at 18 between two capstan drives 20.

In order to provide buffering between the rapidly moving capstans which serve to draw the tape 16 across the magnetic transducer 18, a pair of tape loop chambers 22 and 24 are provided, the tape loop chamber 22 being associated with a supply reel, and chamber 24 being associated with a take-up reel.

The tape loop chambers 22 and 24 are identical and consist of a chamber of generally rectangular cross section with a width approximately equal to the width of the magnetic tape. As the tape 16 is dropped into the chamber 22, a loop 26 is formed, and the tape serves to divide the loop chamber into two separate segments. The top segment, that portion above loop 26, is open to atmospheric pressure while that portion below the loop 26 is maintained at a vacuum by a vacuum blower device 32.

For clarity, the control mechanism for only the right-hand, or supply, reel motor and tape loop chamber is shown and discussed below, it being understood that all elements hereafter discussed are duplicated for control of the left-hand, or take-up, reel motor and loop chamber.

Along the back side of the tape loop chamber are a series of holes 34 which communicate with a closed manifold chamber 36 hermetically attached to the back of the loop chamber wall. The manifold has therein a continuous slot 38 running approximately the full length of the tape loop chamber to which the chamber holes 34 communicate.

In practice, the communicating openings between the tape loop chamber and the manifold may be a continuous slit or passageway running the full length of the chamber, but a plurality of communicating holes have been chosen to lend mechanical rigidity to the structure.

Communicating with the manifold slot 38, is a hose 40 which serves to transmit the pressure within the manifold to a diaphragm 42. The bottom of the diaphragm is vented to atmospheric pressure, so it can be seen that a change in pressure in the tube 40 will cause motion of the diaphragm 42 in an up or down direction. The motion of diaphragm 42 is transmitted through linkage 46 passing through a seal 48 to a leaf spring device 50 of magnetic material which is held rigidly at one end 52 thereof. The other end of the spring is free to move in accordance with the pressure inside the diaphragm device upward or downward as indicated by arrows 56 and 58, in proximity to a magneto-resistive device 54. In operation, as the tape loop position 26 is varied within chamber 22, a differential vacuum is produced in manifold slot 38. The portion of the tape loop chamber above loop 26 communicates with atmospheric pressure and that portion below loop 26 communicates with a vacuum, in this case if approximately 50 centimeters of $H_20$. It can be seen that as the tape loop moves upward and downward in the chamber due to the motion of the tape across capstan 20 lengthening and shortening the size of the tape loop, a differential pressure will be developed in the mainfold proportional to the tape loop position. If the tape loop is at a relatively high point 60 in the loop chamber, the pressure across the manifold will approach 50 Cm. $H_2O$. If, one the other hand, the tape loop were in a low position, 62, in the chamber, the differential pressure in the manifold slot 38 will approach atmospheric pressure. This pressure is, as noted above, communicated by hose 40 to a diaphragm device. Since the lower portion of the diaphragm device is vented to atmospheric pressure, a vacuum in the tape chamber will tend to draw diaphragm 42 upward thus moving spring 50 in a manner indicated by arrow 56. The movement is sensed by the magneto-resistive device 54 in a manner to be later explained.

Figure 2:
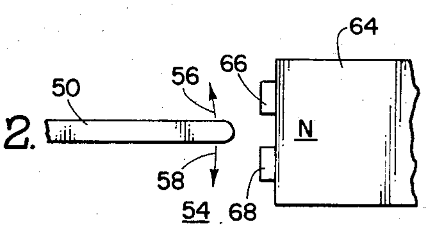
FIG. 2 is an enlarged view of a magneto-resistive sensing device.

FIG. 2 shows an enlarged view of the magneto-resistive device which consists of a permanent magnet 64 upon which are mounted two semiconductor devices 66 and 68. The spring 50 is of magnetic material and, consequently, lines of force are established between the spring 50 and a permanent magnet 64. With the spring in the center position as shown in FIG. 2, the magnetic fields are evenly distributed above and below the spring, with an equal number of magnetic flux lines passing through each device 66 and 68. As the spring 50 is moved upward as indicated by arrow 56, a proportionally larger number of flux lines will pass through semiconductor portion 66 than through semiconductor portion 68. This causes an increase in resistance in semiconductor 66 which has appropriate electrical contacts, not shown, and a proportional decrease in resistance of semiconductor 68 which also has electrical contacts, not shown.

In FIG. 1 is also shown a DC tachometer generator 70 connected to reel motor 14 by a shaft 72. The tachometer generator has an electrical output indicated at 74 which generates a signal proportional to the speed of reel motor 14, as is well known in the art.

Figure 3:
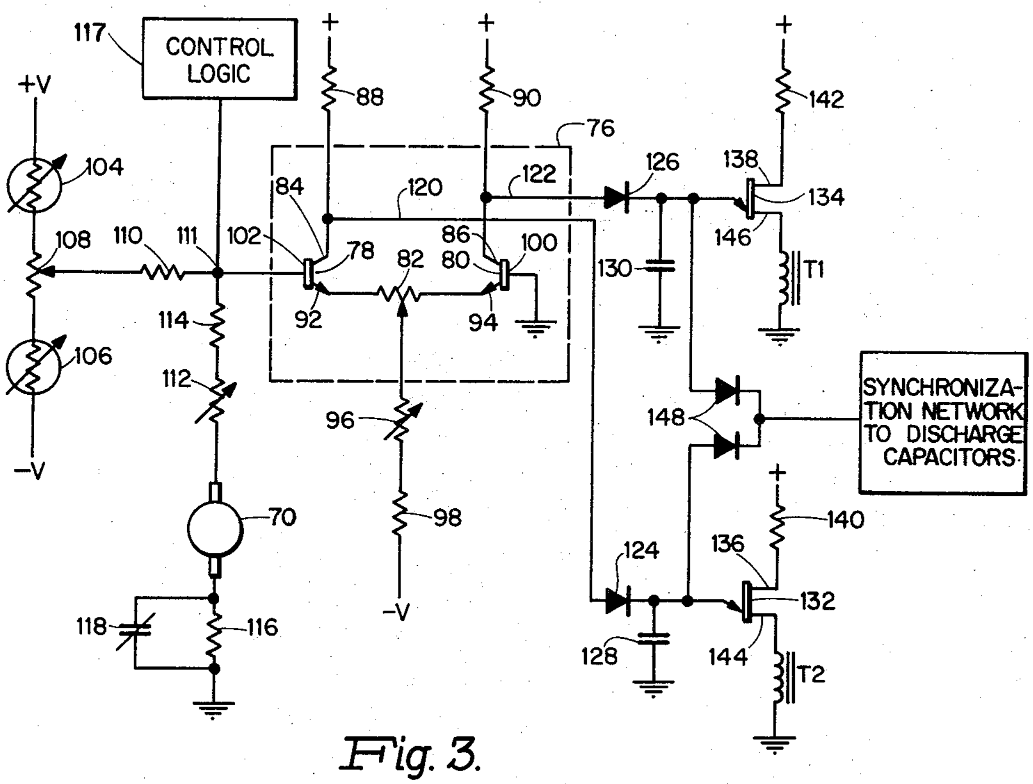
FIG. 3 is a schematic diagram of a control circuit according to the invention.

FIG. 3 discloses a control circuit according to the present invention having a differential amplifier indicated generally at 76. The differential amplifier contains two transistors 78 and 80 and an adjusting resistor 82 to balance the two transistors to obtain equal outputs for equal inputs, to adjust for variation in the transistor characteristics. The two transistors have collectors 84 and 86 which are connected through appropriate biasing resistors 88 and 90 to a positive supply source not shown. Emitters 92 and 94 are connected across adjusting resistors 82 through a gain adjusting resistor 96 and biasing resistor 98 to a negative supply voltage, not shown.

Transistor 80 has a base terminal 100 which is grounded and transistor 78 has a base terminal 102 which is connected as an input to the amplifier and to a summing junction 111, discussed below.

The magneto-resistor device 54 as shown in FIG. 2 is represented as variable resistors 104 and 106 which are joined at their midpoint by a balancing resistor 108, the purpose of which is to adjust the magneto-resistor device for manufacturing imbalances between the two semiconductor portions of the device. Magneto resistor 104 is connected to a positive voltage source and magneto resistor 106 is connected to a negative voltage source each of which may be approximately 5 volts in magnitude. As the spring 50 in FIG. 2 is moved from its upward position to its downward position, the resistance across each of the magneto-resistors may vary from between for example 500 ohms to 2,500 ohms.

The magneto-resistors may be arranged in a bridge network to provide a differential output which varies in amplitude and polarity depending upon spring flexure caused by the pressure variations in the tape columns as shown in FIG. 1. In the instant case, the two individual magneto-resistors are connected as indicated and, as can be seen, will provide a positive or negative voltage output proportional to the spring position caused by pressure variations in the column. The output from the pair of magneto-resistors 104 and 106 is applied through a limiting resistor 110 to the summing junction 111.

The DC tachometer generator 70 previously discussed as being connected to the reel motor is connected through an adjusting resistor 112 and a limiting resistor 114 to the summing junction 111 which serves as an input terminal at the base 102 of transistor 78 of the differential amplifier. Resistor 116, across which is placed a normally closed relay 118, is connected from the other side of DC generator 70 to ground. Resistor 116 merely provides a standard reference to reduce the voltage between the generator 70 and input summing junction 111 to allow a high speed rewind. The relay contact is open for the rewind operation thus lowering the voltage between the DC generator and the summing point and allowing a greater reel motor speed. For normal operation, the relay contact is closed, thus shorting out the resistor 116 and allowing the full developed DC voltage from generator 70 to be applied to the summing junction 111.

It can now be seen that the resultant voltage at summing point 111, comprising a voltage from magneto-resistors 104 and 106 and a voltage from DC generator 70, proportional to both reel motor speed and tape loop position, to the input of the differential amplifier 76.

It will be recognized that although summing junction 111 is used to provide reel motor speed control as a junction of tape loop position and reel speed, the junction 111 may also be used to provide reel motor speed control signals generated by separate logic, for example from an automatic threading or tape positioning logic unit. Such a unit is shown as control logic 117, a complete disclosure of which may be found in U.S. Pat. application of Tolini et al., Ser. No. 29,935 filed on Apr. 20, 1970, and assigned to the assignee of the instant invention.

The outputs of the differential amplifier on lines 120 and 122 are applied through diodes 124 and 126 to capacitors 128 and 130 respectively. As the voltage output from the differential amplifier increases, the voltage across capacitor 128 and 130 increases until a threshold voltage is reached at which point unijunction transistors 132 and 134, respectively, are fired. The bases 1 of the unijunctions, 136 and 138, respectively, are connected through resistors 140 and 142 to a positive voltage source, not shown. Bases 2 of each of the unijunction transistors 144 and 146 are connected through the primary windings of two 1: 1 transformers T1 and T2 respectively. A pair of diodes 148 are connected from the positive terminals of capacitors 128 and 130 to a discharging network which is synchronized with the firing of the unijunctions to completely discharge capacitors 128 and 130 upon firing the unijunctions so that subsequent cycles are started off from constant potentials.

Figure 4:
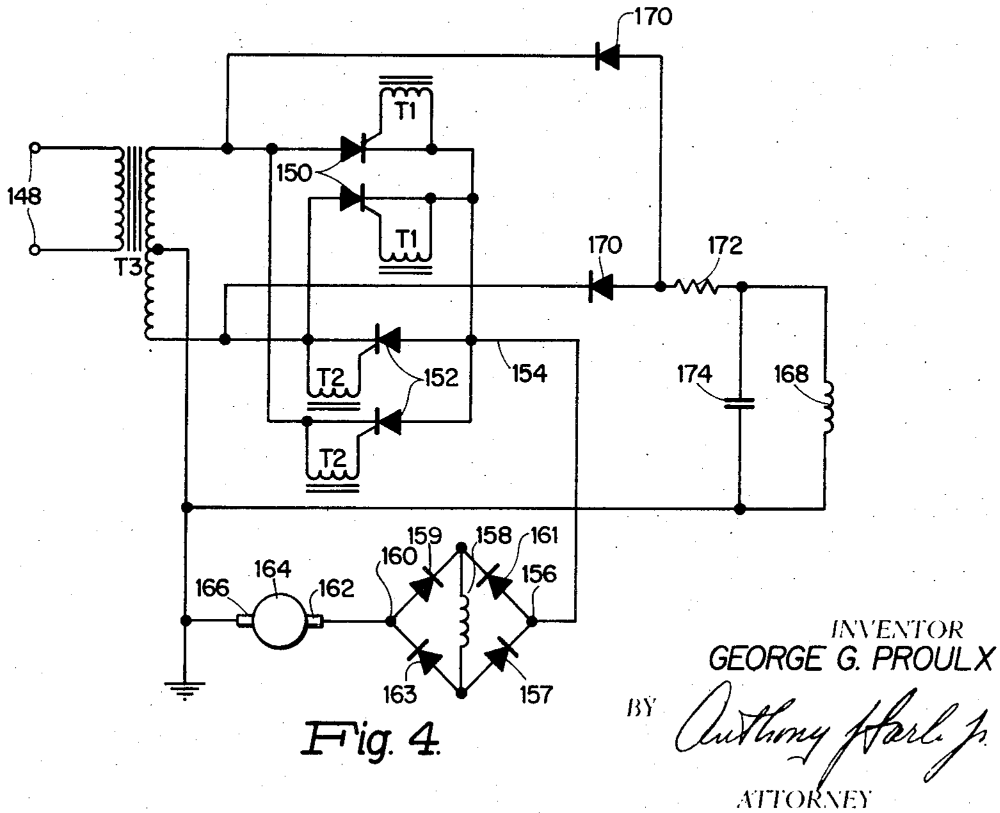
FIG. 4 is a supply circuit for supplying voltage to a reel motor of the compound type in response to the control of FIG. 3.

FIG. 4 is a power supply for a compound motor used as the reel motor in tape drives of this configuration. A pair of input terminals 148 are connected to the primary of a transformer T3 and to a source of 120 volt 60 cycle current. The secondary of transformer T3 is connected to a network of silicon control rectifiers 150 and 152. The gates of SCRs 150 are connected to secondaries of transformer T1 in FIG. 3 and receive an impulse when the unijunction transistor 134 fires through the primary of the transformer. In a like manner, SCR's 152 are connected with their gates associated with secondaries of transformer T2 of FIG. 3. When either pair of SCR's is fired, a voltage is established along line 154 to one terminal 156 of a diode bridge rectifier. Between opposite terminals of the diode network is the series field 158 of the compound motor. At another terminal 160 of the bridge network, one terminal 162 of motor 164 is connected, the other terminal 166 of the motor armature being grounded together with the center tap of the transformer T3 secondary. The motor shunt field winding 168 is likewise grounded on one side, and receives a voltage from the secondary of transformer T3 to its other terminal through a pair of diodes 170 and a resistor 172. A shunt capacitor 174 is connected across the shunt field winding.

Figure 5:
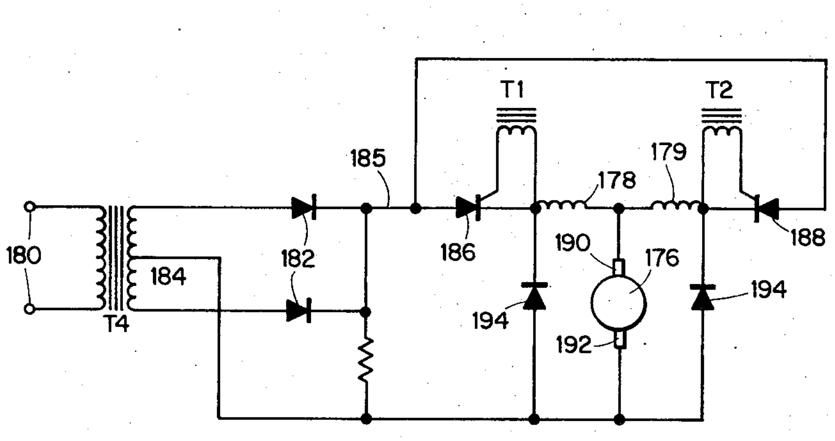
FIG. 5 is a control similar to that of FIG. 4, but for a split series type motor.

As an alternative embodiment, FIG. 5 discloses the power connections for a split series motor with the armature shown generally at 176 and the series field windings at 178 and 179. A 120 volt 60 cycle source is applied to a pair of input terminals 180 of a transformer T4, the secondary of which is rectified by a pair of diodes 182. The center tap 184 of the transformer T4 secondary is connected to a common return. The rectified outputs of diodes 182 are applied along line 185 to a pair of SCR's 186 and 188, whose gates, again, are connected to the secondaries of transformers T1 and T2 of FIG. 3. The output side of the SCRs 186 and 188 are applied to opposite terminals of the series field, two terminals of the series field being connected together to the armature terminal 190 of the motor 176. The other armature terminal 192 is connected to a common return. A pair of diodes 194 serve as blocking diodes to prevent the current through the SCR's from passing directly to the common return.

OPERATION OF THE DEVICE

Each loop servo consists of a tape loop chamber 22 with holes 34 communicating with a manifold 36 as shown in FIG. 1. The manifold communicates by means of hose 40 to a diaphragm-operated leaf spring 50 mounted firmly at one end 52 and having a non-physical-contact magnetic path at the other end thereof to vary the magnetic field intensity to a pair of magneto-resistors 66 and 68 mounted to the face of an electro or permanent magnet. The magneto-resistors are excited by a positive and negative DC voltage source to provide a differential output which varies in amplitude and polarity depending upon spring flexure caused by pressure variations in the tape loop chambers.

The output from the magneto-resistors is summed with the output of a DC generator 70 mounted on a reel motor shaft, and the sum provides the input to a differential amplifier 76, containing a pair of transistors 78, 80. The collectors 84, 86 of the transistors are coupled to unijunction transistor firing networks to control the firing angles of appropriate silicon control rectifiers (SCRs) 150, 152 (FIG. 4), to apply driving voltage to the reel motor armature and field windings for driving the motor clockwise or counterclockwise.

The normal working vacuum in the loop chambers is approximately 50 Cm. $H_20$ to maintain adequate tape tension across the capstans and transducer. The vacuum output form the manifold will vary from 50 Cm. $H_20$ to zero depending upon the tape loop position. When the loop is in the center of the chamber, the vacuum at the manifold is approximately 25 Cm. $H_20$. At this point the magneto-resistors 66, 68 and spring 50 are adjusted to provide a null. If the tape is moved above this point, the vacuum in the manifold will increase thus causing diaphragm 42 and lead spring 50 to move upward as indicated by arrow 56 in FIG. 1. With the spring in this position, the magnetic flux through magneto-resistor element 66 will be increased, thereby increasing the resistance which is connected to the positive voltage source. In a similar manner, the resistance of magneto-resistor 68 (corresponding to magneto-resistor 106 in FIG. 3) will be decreased allowing that input voltage appearing at summing junction 111 to assume a negative value.

As a negative voltage is applied to the base of transistor 78, the transistor tends to turn off, thus increasing the potential at collector 84 to a more positive value. Through the use of biasing resistor 98 and gain adjust resistor 96, the nominal output from the collectors 84 and 86 of the two transistors is chosen to be approximately 6 volts, or slightly less than the firing voltage (normally 7 to 9 volts) of the unijunction transistors 132 and 134. Since the voltage at collector 84 will now appear more positive, a charge will build on capacitor 128 until the firing voltage of unijunction 132 is exceeded at which time the unijunction will discharge through the primary of transformer T2.

Capacitor 128 will be then discharged, and if a negative voltage remains on the collector of transistor 78, another voltage build-up will begin on capacitor 128 causing repeated firing of unijunction 132 at a rapid rate, at least several times the frequency of the motor armature supply voltage.

The firing of unijunction 132 triggers the gates of SCR's 152 in FIG. 4, allowing a full-wave-rectified DC signal to appear at terminal 156 of the diode bridge rectifier associated with motor armature 164. Since the pulsating DC polarity is negative, the current will pass through diode 157, through field winding 158 and then through diode 159 to the motor armature terminal 162 causing the motor to rotate in a clockwise or forward direction.

As the motor 164 gains speed, the output from DC generator 70 will be positive tending to oppose the output from the magneto-resistors at summing junction 111. As a result, the motor will be speed regulated in a continuous manner in a zone determined by the diameter of the tape reel. For example, if the reel size were small, the motor speed would be higher than if the reel were large. The tape reel can vary in speed by a factor of 2 to 1 due to the build-up of tape from a small to a large diameter. The extremes of the tape loop column are utilized by the small diameter reel and the large diameter reel to maintain a lesser excursion of the tape loop within the tape loop chamber. Obviously, since the speed of the motor will be highest with small diameter reels, the small diameter reel speed will determine the initial, preset value of resistance 112, 114 in series with the generator at the summing point.

If, on the other hand, the tape falls to a low position 62 in the tape loop chamber, the pressure in the manifold will increase, thus allowing spring 50 to travel downward as indicated by arrow 58. This tends to increase the resistance of magneto-resistor 106 and decrease the resistance of magneto-resistor 104, allowing a positive voltage to appear at a summing junction 111. The application of a positive voltage to the base terminal 102 of transistor 78 tends to turn transistor 78 on thus lowering the potential at the collector 84. At the same time, transistor 80 tends to turn off, thus raising the potential at collector 86 and applying a positive voltage in excess of 6 volts to capacitor 130. Again, as the capacitor charge exceeds the firing point of the unijunction 134, a voltage is produced through the primary of transformer T1 which will trigger SCR's 150 in FIG. 4 allowing a positive pulsating DC current to appear on line 154 and at terminal 156 of the diode bridge network. With a positive voltage at 156, the current developed will travel through diode 161, through field winding 150 and through diode 163 to terminal 162 of motor armature 164. This will cause the motor to turn in a counterclockwise or reverse direction, causing the DC generator 70 to produce a negative voltage output, again, tending to counteract the effect of the positive voltage of magneto-resistors 104 and 106.

As previously indicated, additional control signals may be applied to summing junction 111 from control logic 117, which control signals will cause the operation of the device to proceed in manner similar to that above.

A similar analysis can be made for the split series motor case as shown in FIG. 5, where, as transformer T2 develops a pulse in the secondary thereof, SCR 188 is turned on allowing a voltage pulse to pass through field winding 179 and then through armature 176 to a common return, thus driving the motor 14 in a clockwise or forward direction. On the other hand, when transformer T1 is activated, SCR 186 is turned on allowing the rectified DC voltage to pass through series to field winding 178 and then through armature 176 to the common return to drive the motor in a counterclockwise or reverse direction.

It can be seen that the tape loop sensor and motor speed control of the instant invention offers a relatively uncomplex and reliable means of controlling the motor speed in response to the position of the tape loop in the tape loop chamber of a digital tape drive.

While in accordance with the provisions of the patent law, the above has illustrated and described preferred forms of the invention in exemplary construction and operation, it will be apparent to those invention in in the art that changes may be made in the apparatus described without departing from the spirit and scope of the invention as set forth in the appended claims and that in some cases, certain features of the invention may be used to advantage without a corresponding use of other features or that certain features may be changed or substituted for equivalently as appreciated by those skilled in the art.

Having now described the invention what is claimed as novel and to be secured by Letters Patent is:

1. A tape loop positioning system for a tape transport, comprising:

a. a tape loop chamber provided with a vacuum source at a first end thereof and a source of atmospheric pressure at a second end thereof,
b. manifold means adjacent to and communicating with said tape loop chamber,
c. sensing means for sensing pressure in said manifold means,
d. a magneto-resistive device connected to said sensing means for generating a first signal,
e. driving means,
f. signal generating means connected to said driving means for generating a second signal,
g. summing means for summing said first and second signals,
h. means responsive to said summing means for providing a third signal, and
i. said third signal being applied to said driving means.

2. A tape loop positioning system as set forth in claim 1 wherein said driving means drives a tape reel means.

3. A pneumatically pneumatically servo comprising:

a. driving means driving a member, said driving means having an input,
b. pneumatic means for sensing the position of said member,
c. a magneto-resistive device to said sensing means for generating a first signal,
d. means responsive to said driving means for generating a second signal,
e. means responsive to said first and second signals for generating a third signal, and
f. means for applying said third signal to said driving means input.

4. A servo as set forth in claim 3 wherein said means responsive to said first and second signals is a summing means.

5. A pneumatically controlled servo as set forth in claim 3 wherein: said pneumatic means includes a diaphragm means.

6. A pneumatically controlled servo as set forth in claim 5 further comprising:
a. a chamber in which said member is to be positioned,
b. a manifold connected to said chamber,
c. said diaphragm means connected to said manifold.

7. A pneumatically controlled servo as set forth in claim 3 further comprising:
a. diaphragm means forming part of said pneumatic means, and
b. said diaphragm means connected to control said means for generating a first signal.

8. In a tape drive mechanism having a tape reel with a motor for driving said reel, means for actuating said motor comprising:
a. means for generating a magneto-resistor first signal proportional to tape position,
b. means for generating a second signal proportional to the speed of said motor,
c. summing means for summing said first and second signals, and
d. means responsive to said summing means for actuating said motor.

9. In a digital computer tape drive having a reel, reel driving means and tape loop chamber means for actuating said reel driving means comprising:
a. tape loop sensing means providing a linear loop sensing signal proportional to the position of tape in said tape loop chamber,
b. transducer means responsive to said loop sensing signal for generating a proportional linear first signal representative of said tape position,
c. means responsive to the speed of said reel for generating a second signal, and
d. means responsive to said first and second signals for actuating said reel driving means.

10. In a tape transport system having a driving motor, a servo system for maintaining a desired tape loop length in a vacuum chamber comprising:
a. tape loop sensing means including a plurality of pressure sensing holes in said chamber;
b. a pressure sensing switch responsive to pressure at any one of said sensing holes for generating a first signal proportional to said tape loop length;
c. tachometer means for generating a second signal proportional to the speed of said motor;
d. summing means responsive to the algebraic sum of said first and second signals; and,
e. means responsive to summing means for actuating said motor.

11. A system as defined in claim 10 wherein said vacuum chamber is provided with a vacuum source at a first end and an atmospheric pressure source at a second end,
said plurality of pressure sensing holes is between said first and second ends and senses the differential pressure generated by said sources, and
said pressure responsive switch is a diaphragm which has movements as a result of the changing of said differential pressure.

12. A tape transport system for providing tape storage from a reel to a vacuum chamber by means of tape loops comprising:
a. tape loop sensing means for generating a differential pressure signal representative of the location of the tape loop,
b. transducer means for generating a linear magnetic signal proportional to said differential pressure signal,
c. semiconductor means responsive to said transducer magnetic signal and providing a linear first input signal,
d. second signal means responsive to reel speed for providing a second input signal, and
e. summing means for summing the algebraic sum of said first and second input signals for maintaining the tape loop in a predetermined position.

13. A system as defined in claim 12 and further comprising:
a motor,
a third signal means responsive to said summing means for generating a first output when said summing means is in a first state or a second output when said summing means is in a second state,
first means responsive to said first output for actuating said motor in a first direction, and
second means responsive to said second output for actuating said motor in a second direction.

14. A system as defined in claim 13 wherein said third signals means includes a differential amplifier, and
said semi-conductor means includes at least one variable pressure resistor.

15. A mechanism as set forth in claim 4 wherein said first and second means are SCR's of first and second polarity, respectively.

* * * * *